Toshihisa Takada
Hisao Ishikawa
Keishi Tudo
BY Yukio Matsui

INVENTORS

George B. Oujevolk
Attorney

3,481,782
METHOD OF MANUFACTURING ELECTRIC INSULATED WIRES COATED WITH FOAMED SYNTHETIC RESIN

Toshihisa Takada, Sakura-shi, Hisao Ishikawa, Tokyo, Keishi Tado, Ichikawa-shi, and Yukio Matsui, Chiba-shi, Japan, assignors to The Fujikura Cable Works, Ltd., Tokyo, Japan, a corporation of Japan
Filed Jan. 20, 1967, Ser. No. 610,659
Claims priority, application Japan, Jan. 24, 1966, 41/4,009
Int. Cl. B44d *1/42, 1/44*
U.S. Cl. 117—232                                1 Claim

---

ABSTRACT OF THE DISCLOSURE

An electric insulated wire coated with foamed synthetic resin is manufactured by melting a crystalline synthetic resin, dissolving the molten resin in a solvent, applying the resin solution onto a bare electric conductor wire to coat it, cooling the coated layer of resin solution to cause it whitening and then heating the whitened layer to cause it to form. The apparatus for carrying out the method comprises a melting mechanism adapted to heat and melt the resin, a mixing mechanism adapted to contact molten resin with a solvent supplied from a source of supply, a dissolution mechanism adapted to heat the mixture to dissolve the resin in the solvent and a coating mechanism to apply the resin solution onto the conductor wire.

---

Figure 1:
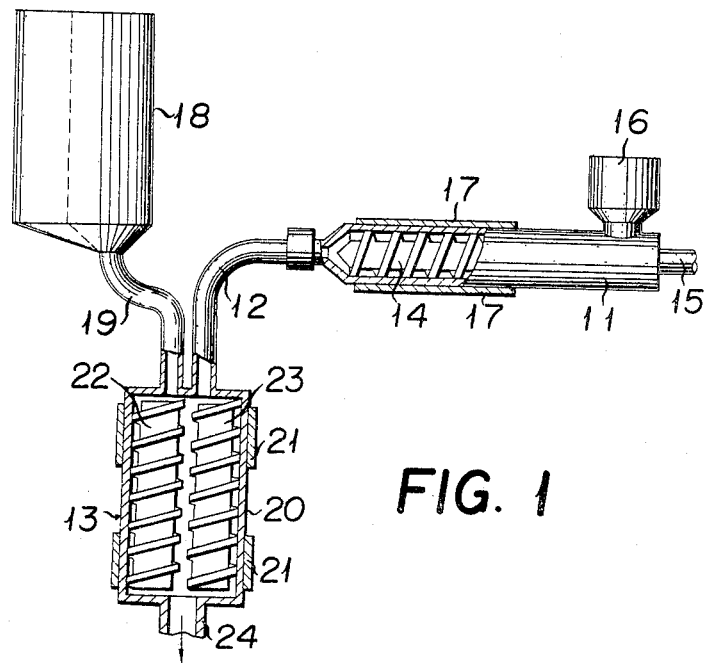

This invention relates to a method of and apparatus for manufacturing electric insulated wires wherein the wires or electric conductors are coated with crystalline synthetic resin, and more particularly to a novel method of and apparatus capable of continuously applying a layer of synthetic resin of uniform thickness upon the conductor.

In manufacturing an electric insulated wire having a coating of a foamed synthetic resin, such as a conductor wire of a communication cable, for example, an electric wire coated with a foamed crystalline resin such as foamed polyethylene or foamed polypropylene, where the crystalline synthetic resin is applied onto a bare conductor, it is usual to pass the bare conductor through a suitable solution containing the crystalline synthetic resin dissolved therein, and then to pass the coated wire through a suitable die which determines the thickness of the resin layer coated around the conductor as well as the cross-sectional configuration thereof. Thereafter the solvent contained in the coated layer is vaporized off except a portion of the solvent and then the coated conductor is heated such that independent cells are formed in the coated layer by rapid evaporation of the solvent.

In order to form a uniform coating layer on the surface of a bare conductor by the process outlined hereinabove it is necessary to sufficiently and uniformly dissolve the resin in the solvent. By this reason a predetermined quantity of the resinous raw material in the form of pellets is dissolved in a solvent contained in a vessel provided with a stirrer until a predetermined concentration is reached. The resin solution thus obtained is transferred in a storage tank also provided with a stirrer from the dissolving vessel and required quantities are successively fed to a coating mechanisms. The raw material is again charged in the empty dissolving vessel and dissolved therein. Such a cycle of operation is repeated intermittently.

However, in order to uniformly dissolve a synthetic resin which is a high molecular substance into a solvent, satisfactory result could not be expected by merely contacting the resin with the solvent under agitation because of low dissolving speed of the resin into the solvent. Consequently, it requires a considerably long time to completely dissolve the resin, thus causing decrease in the manufacturing efficiency of the insulated wire. Moreover, with regard to the resin solution to be fed to the coating mechanism, since it is necessary that the resin has been uniformly dissolved in the solvent, it is difficult to continuously feed the resin solution to the coating mechanism. Thus, in order to effect continuously the coating operation over a a long period of time it is necessary to prepare beforehand a large quantity of resin solution, thus requiring a dissolving vessel and a storage tank of large capacities. These problems involved in manufacturing installation cause increase in the manufacturing cost of insulated electric wires.

The principal object of this invention is to enable to continuously provide a homogeneous coating layer on a bare conductor by continuously dissolving the raw material resin in the solvent at a high efficiency and by continuously feeding the solution to a coating mechanism.

Another object of this invention is to provide a method of effectively and continuously dissolving crystalline resinous raw material in a solvent to obtain a solution of resin which is fed continuously to a coating mechanism. According to the novel method the resin is molten beforehand by heating, and then the solvent is incorporated into the molten resin to be throughly mixed therewith. By this method it is possible to dissolve the resin in a very shorter time when compared with the conventional case wherein the solvent is directly contacted with the solid state resinous raw material.

Further, object of this invention is to provide a novel apparatus for dissolving the resin in the solvent according to the novel method described above.

Figure 2:
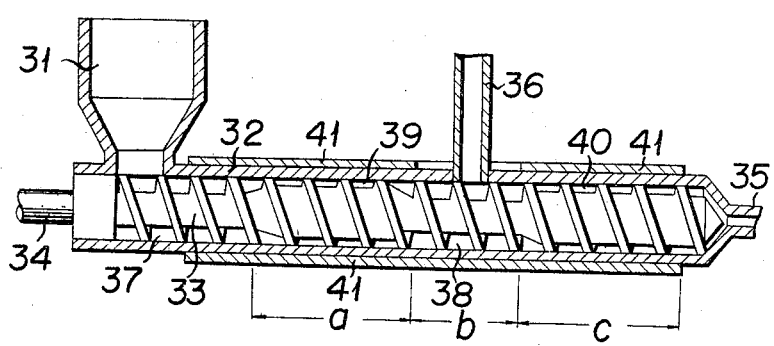

The features of the invention which are believed to be novel are set forth with particularity in the appended claims. The invention itself, however, as to its organization together with further objects and advantages thereof, may best be understood from the following description taken in connection with the accompanying drawing, in which:

FIG. 1 is a side elevation, partly in section, of one embodiment of the coating apparatus constructed in accordance with the principle of this invention; and FIG. 2 shows a longitudinal section of a modified embodiment of this invention.

Referring now to FIG. 1 of the accompanying drawing, an exit part of an extruder 11 having identical construction as the conventional extruder is connected to the inlet side of a mixing mechanism 13 through a pipe 12. The extruder 11 is shown as a screw type comprising a cylinder, a screw 14 contained therein and adapted to be driven by a driving shaft 15 which is connected to a not shown driving source, a hopper 16 for supplying the raw material and a heater 17 adapted to heat and melt the raw material moved by the screw. On the inlet side of the mixing mechanism is connected the lower end of a pipe 19 leading from the bottom of a solvent container to supply the solvent to the mixing mechanism.

The mixing mechanism comprises a casing 20 having heater 21 on its outer periphery and a plurality of (two, for example) screws 22 and 23 disposed in the casing and arranged to be driven by a suitable driving source, not shown. The pitch of the screw threads is selected such that the molten resin and the solvent fed into the mixing mechanism are mixed together while they are moved towards an exit pipe 24 connected to the delivery side. The other end of the exit pipe 24 is connected to a mechanism adapted to apply the resin solution to a bare conductor, for example, a cross-head or a reservoir associated with a coating tank.

A crystalline synthetic resin raw material, for example, polyethylene in the form of pellets, is continuously fed into the extruder 11 from the hopper 16 and is then moved towards exit port by means of the rotating screw 14. Because the interior of the extruder is heated by the heater 17 to a temperature higher than the softening point of polyethylene the resin will be softened or molten while it is conveyed through the extruder and softened or molten resin will be supplied to the mixing mechanism 13 through the pipe 12. On the other hand the solvent contained in the solvent container 18 and heated to a temperature, preferably to a temperature about 10° C. lower than the boiling point thereof, is continuously fed into the mixing mechanism 13 through the pipe 19 under control of a suitable flow adjusting mechanism which functions to control the flow rate such that a resin solution having a fluidity suitable for coating the bare wire by means of the coating mechanism. Thus, in the mixing mechanism, the solvent will be caused to contact with the resin which has already been molten by the temperature above its softening point so that the solvent is effective to rapidly and uniformly dissolve it. The solution thus prepared is then fed to the coating mechanism under a predetermined pressure.

Such a rapid and continuous dissolution of the resin results in a number of outstanding advantages in the manufacturing process steps of electric insulated wires. One of the advantages is that it enables continuous operation of the steps of coating the bare wire with resin as well as to increase the running speed of the wire. In this connection it is not necessary to construct so large the apparatus necessary for producing long coated wires as that for applying by the dissolution operation in the batch system.

More importantly, it is possible to rapidly prepare a resin solution which contain less proportion of solvent with respect to resin. This results not only in the saving of the quantity of the solvent necessary for coating resin but also prevention of undesirable changes in the resin layer, for example formation of irregular shape of the cross-section thereof, thus greatly increasing the manufacturing speed of the electric wires.

The process of manufacturing an insulated wire having a covering of a foamed resin layer comprises the steps of coating the resin solution onto a bare wire, removing the solvent from the coated layer of resin solution except a portion of the solvent, cooling the layer of resin solution to a temperature below the clouding point thereof, heating it again to evaporate the remaining solvent thus forming foams, and finally cooling the foamed layer. The above described step of cooling the layer of resin solution is in designated as "whitening step" and constitutes one of the most important steps which permits foaming by rapid evaporation of the solvent owing to crystallization of the resin in the layer of the resin solution and to the growth of resin crystals. If the proportion of the solvent contained in the resin layer prior to the whitening step were excessively high it would of course take longer time for the crystallization of the resin and for the growth of the resin crystals, thus making it difficult to effect sufficient crytallization. As a consequence the efficiency of the whitening step would be decreased, thus resulting in the above mentioned irregular shape or non-foamed portions in the layer of foamed resin.

According to this invention, however, since the resin is caused to contact with the solvent in the form of molten liquid produced by heating the resin instead of solid state the resin could be rapidly and homogeneously dissolved in the solvent of relatively low proportion with respect to resin. For example, even with only 1.0 to 1.8 parts by weight of the solvent based on the weight of the resin, it was possible to obtain a resin solution having sufficient fluidity not to disturb coating operation. According to prior method, however, in order to obtain sufficient fluidity enough to effect satisfactory dissolution and coating steps by utilizing the same resin and solvent it was necessary to use at least 2, usually about 2.5 parts, by weight of solvent based on the weight of the resin. Such reduction in the proportion of the solvent contained in the layer of applied resin solution not only shortens the time necessary for effecting whitening upon cooling the layer of the resin solution to a temperature of whitening point but also essentially eliminate the solvent remaining in the layer of coated resin after foaming. Heretobefore it has been inevitable that after issuing from a foaming furnace about twenty percent of the solvent based on the total weight of the applied resin layer remained unremoved. According to this invention it is possible to effectively prevent decrease in the diameter of the coated wire due to evaporation of the solvent after the wire has been wound on a reel as well as loose turns due to such reduction of the wire diameter.

FIG. 2 shows a modified coating apparatus embodying this invention. More particularly, a screw 33 is contained in a cylinder 32 provided with a hopper 31 at its one end, the screw being rotated by a driving shaft which is connected to a suitable source of drive, not shown. On the end of the cylinder opposite to the hopper 31 is formed an exit pipe 35, and a pipe 36 for supplying the solvent is connected to the interior of the cylinder at an intermediate point between the hopper 31 and the exit pipe 35. The screw comprises deeply threaded sections 37 and 38 respectively opposite to the hopper 31 and the pipe 36 and shallowly threaded sections 39 and 40 respectively between said sections 37 and 38, and between the section 38 and the exit pipe 35. A suitable heater such as an electric band heater 41 provided on the outer peripheral surface of the cylinder 32.

The hopper 31 continuously supplies crystalline synthetic resin raw material which is successively moved in the cylinder 32 towards the exit pipe to reach a heating region $a$ as the screw 33 is rotated. The heating region $a$ is heated by the heater 41 to a temperature above the softening point of the synthetic resin raw material used to perfectly melt under pressure the resin material while it is forced through the region $a$. The molten raw material is then sent to a region $b$ of reduced pressure and having a wider space. A predetermined quantity of the heated solvent is supplied continuously to the region $b$ of reduced pressure through the pipe 36 to come into contact with the molten resin. The mixture of the resin and solvent is then sent to the next succeeding region $c$ under pressure to be again subjected therein to pressure and heat, thus producing homogeneous resin solution, which in turn is supplied to a suitable coating mechanism, not shown, through the exit pipe 35. In order to obtain homogeneous molten resin it is preferable to select the temperature of the pressurized region $c$ to be slightly higher than the boiling point of the solvent. For example, where xylene (boiling point 135 to 145° C.) is selected as the solvent a temperature of approximately 150° C. is the most suitable temperature. It is also possible to make easier control of the pressure and temperature in regions $a$ and $b$ by providing an oppositely threaded portion for the screw between regions $a$ and $b$ and by providing a by-pass around this portion.

When the resin solution containing the solvent and resin at a weight ratio of 1.0 to 1.8 is coated on a bare wire by means of a cross-head, advantageous pressure of the resin solution in the cross-head ranges from 1,000 to 50,000 g./cm.$^2$, more preferably from 5,000 to 10,000 g./cm.$^2$. Under these conditions the layers of the resin solution formed on the bare wire will have uniform thickness thus permitting to advance the bare wire at an economically advantageous speed. Under higher pressure it becomes possible to use a resin solution of higher viscosity, thus further reducing the quantity of solvent used with respect to that of resin. However, in order to obtain excellent foamed resin layers, it is preferable that the quantity, by weight, of the solvent should be equal to or more than that of the resin.

The following specific example is given by way of illustration, and is not to be construed as limiting in any way the scope and spirit of the invention.

EXAMPLE

In the apparatus shown in FIG. 2, 1 part of high density polyethylene (polyethylene sold by Hercules Powder Co. under the trade name of "Hi Fax 1606E") and 1.3 parts, by weight based on the weight of the resin, of xylene acting as the solvent were used. A conventional cross-head was mounted on the tip of the exit pipe 35 and a bare wire of 0.32 mm. diameter was passed at a speed of 200 meters per minute. The polyethylene was heated to a temperature of from 120 to 130° C. and molten in the region $a$. After contacted by the solvent in the region $b$, the mixture was heated to about 150° C. in the region $c$ and then forced into the cross-head at a pressure of about 10,000 g./cm.$^2$ to cover the bare wire. The layer of resin solution applied on the wire was then air cooled thus causing whitening thereof. Then the layer was foamed by passing the coated wire through a heating furnace having a length of 5 meters and an internal temperature of about 500° C. The coating layer of the insulated wire thus obtained contained a plurality of pores or cells of 10 to 30 microns diameter, the percentage of generation of cells being about 20%. The overall diameter of the electric wire including the insulating coating layer was 0.48 mm. The surface of the coated layer was very smooth and neither irregularly shaped portion nor non-foamed portion was noted.

While the invention has been explained by describing particular embodiments thereof, it will be apparent that improvements and modifications may be made without departing from the scope of the invention as defined in the appended claim.

What is claimed is:

1. A method of manufacturing an electric insulated wire coated with foamed synthetic resin comprising the steps of melting a crystalline synthetic resin, mixing the molten resin with 1.0 to 1.8 parts by weight, based on the weight of the resin, of heated solvent therefor to form a resin solution, applying the resin solution onto a bare conductor wire to coat it under a pressure of 1,000 to 50,000 g./cm.$^2$, cooling the layer of the resin solution applied on the bare conductor wire to cause whitening thereof, and heating the whitened layer of the solution to cause it to foam.

References Cited

UNITED STATES PATENTS 3,170,682   2/1965   Rokunohe et al. ____ 117—119.2

MURRAY KATZ, Primary Examiner

R. M. SPEER, Assistant Examiner

U.S. Cl. X.R.

117—62